(No Model.)

G. J. RIDLEY.
GRINDING MACHINE.

No. 425,186.  Patented Apr. 8, 1890.

WITNESSES:
H. Walker
C. Sedgwick

INVENTOR:
G. J. Ridley
BY Munn & Co.
ATTORNEYS.

UNITED STATES PATENT OFFICE.

GEORGE J. RIDLEY, OF AUBURN, NEW YORK.

GRINDING-MACHINE.

SPECIFICATION forming part of Letters Patent No. 425,186, dated April 8, 1890.

Application filed May 15, 1889. Serial No. 310,880. (No model.)

*To all whom it may concern:*

Be it known that I, GEORGE J. RIDLEY, of Auburn, in the county of Cayuga and State of New York, have invented a new and Improved Grinding-Machine, of which the following is a full, clear, and exact description.

The object of the invention is to provide a new and improved grinding-machine which is simple and durable in construction, effective in operation, and specially designed for grinding razors and similar articles concave or hollow.

The invention consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1:
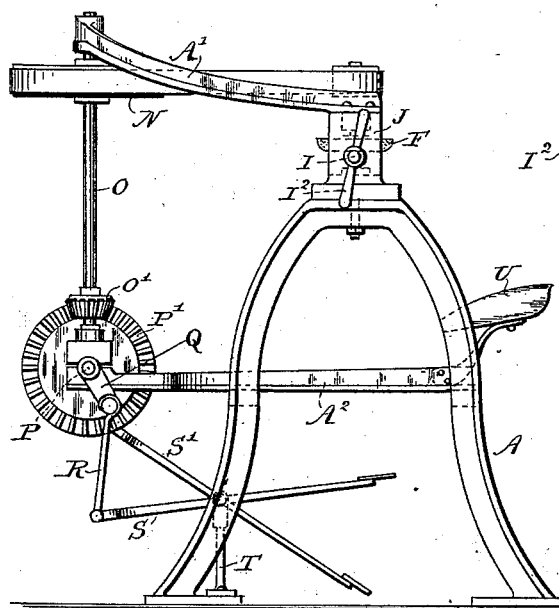
Figure 2:
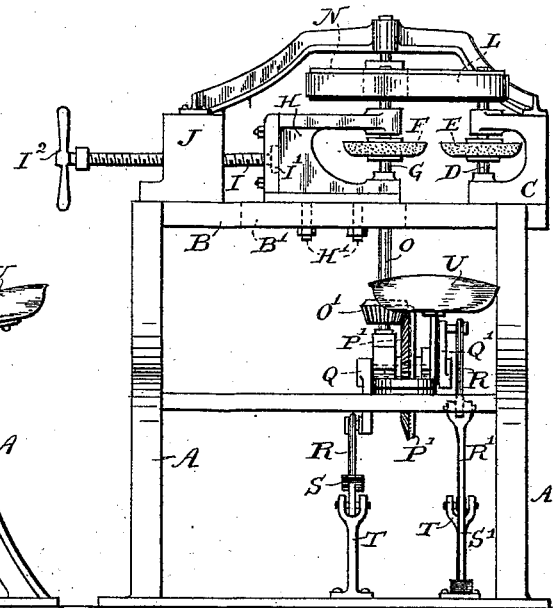
Figure 3:
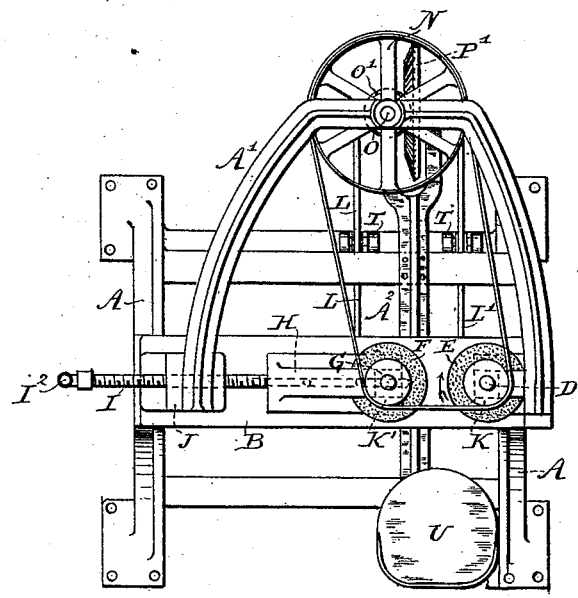

Figure 1 is a side elevation of the improvement. Fig. 2 is a front view of the same, and Fig. 3 is a plan view of the same.

The improved grinding-machine is provided with the standards A, connected with each other on top by a beam B, supporting a bearing C, in which is vertically journaled a shaft D, carrying a grinding-wheel E, having its periphery curved, as is plainly shown in Fig. 2. Directly opposite the grinding-wheel E is located a second grinding-wheel F, secured on a shaft G, extending parallel with the shaft D and mounted to turn in suitable bearings formed on a block H, mounted to slide transversely on the transverse beam B. The block H is provided with the bolts H′, extending downward through a slot B′ in the transverse beam B, said bolts serving to lock the block H in place when adjusted to the proper position. The block H is moved transversely by means of a screw I, provided with a head I′, mounted to turn in the block H. The screw I screws in a nut J, secured on top of the beam B, and the said screw is provided on its outer end with a handle I² for conveniently turning said screw in order to move the block H and its grinding-wheel F forward or backward—that is, nearer to or farther from the opposite grinding-wheel E.

On the upper ends of the shafts D and G are secured the pulleys K and K′, over which passes a belt L, also passing over a large pulley N, secured on the upper end of a shaft O, mounted to turn in suitable bearings formed in the brackets A′ and A², of which the latter is supported on the standards A, while the former is secured on the nut J and the bearing C. The shaft O extends vertically, and is provided near its lower end with a bevel-pinion O′, meshing into a bevel gear-wheel P′, secured on the transversely-extending shaft P, mounted to turn in suitable bearings formed in the bracket A².

On the ends of the shaft P are held crank-arms Q and Q′, pivotally connected by the links R and R′, respectively, with treadles S and S′, respectively, mounted to turn on a bracket T, secured to the base of the standards A. A seat U is located in front of the machine in such a manner as to enable the operator seated on the said seat to conveniently actuate the treadles S and S′.

The operation is as follows: The operator, seated on the seat U, actuates the treadles S and S′, so that the shaft P is turned, and by its connection with the shaft O imparts a rotary motion to the latter. The rotary motion of the shaft O is transmitted to the shafts D and G by means of the pulleys N, K, and K′ and the belt L. The grinding-wheels E and F, secured on the said shafts D and G, are thus rotated in opposite directions. The operator, seated on the seat U, takes hold of the razor to be ground at the back, with the sharp edge upward, and passes the razor between the two rotating grinding-wheels E and F, the razor being moved horizontally toward and from the operator. The curved peripheries of the two grinding-wheels E and F grind the razor hollow, and any desired thickness may be left on the razor, according to the distance between the two grinding-wheels E and F. As the distance between the two grinding-wheels can be conveniently regulated by the operator adjusting the screw I, it is evident that the razor may be ground to any degree of fineness required. It will further be seen that this device does not require a skillful operator in order to grind a razor perfectly true.

Having thus fully described my invention, I claim as new and desire to secure by Letters Patent—

1. In a machine for "hollow-grinding" razors, the combination, with the frame, two parallel shafts provided with aligned grinding-wheels having rounding peripheries and spaced to receive between them the razor to be ground, and means for regulating the space between the two wheels, substantially as set forth.

2. The combination, with the frame A B, having horizontal upper and lower brackets A' A², provided with vertically-aligned bearings, the shaft O, journaled in said bearings and having a horizontal pulley on its upper end, a transverse shaft geared to the shaft O, and means for operating said transverse shaft, of the fixed block C and adjustable block H at the front of the frame and each having aligned bearings, vertical shafts D G, mounted in said bearings, pulleys on the upper ends of said shafts, a belt passing around the three pulleys, the grinding-wheels E F on said shafts in the same plane, and means for adjusting the block H toward and from the block C, substantially as set forth.

GEORGE J. RIDLEY.

Witnesses:
A. H. SEARING,
CHARLES L. PRICE.